United States Patent Office 3,138,638
Patented June 23, 1964

3,138,638
POLYMERIC DIPHENYL PHOSPHONITRILE
MANUFACTURE
Irving I. Bezman and Charles T. Ford, Pittsburgh, Pa., assignors to Armstrong Cork Company, Lancaster, Pa., a corporation of Pennsylvania
No Drawing. Filed Jan. 8, 1962, Ser. No. 164,990
1 Claim. (Cl. 260—551)

This invention relates to an improved method for the preparation of cyclic diphenyl phosphonitriles of the formula $[(C_6H_5)_2PN]_x$ and more particularly relates to a simple method for the production of $[(C_6H_5)_2PN]_3$ in high yield.

Although several methods are known for the preparation of polymeric cyclic diphenyl phosphonitriles, the reported yields are low. Thus, H. Rosset, Compt. rend. 110, 750 (1925), and H. Bode and R. Thamer, Ber. 76, 121 (1943), report only very small yields of $[(C_6H_5)_2PN]_n$ compounds by the action of phenyl magnesium bromide on phosphonitrilic chloride trimer, $(NPCl_2)_3$. More recently, Haber, Herring and Lawton (J. Amer. Chem. Soc. 80, 2116 (1958)), teach a preparation of the cyclic trimer and cyclic tetramer by means of the reaction of diphenyl phosphorus trichloride with ammonium chloride in tetrachloroethane at 130–135° C. and a second preparation by means of the reaction of diphenyl phosphorus trichloride with excess liquid ammonia to produce a mixture of diphenyl phosphonitrile polymers. The same preparations are taught by U.S. Patent 2,853,517 to C. G. Fitzgerald et al., with the emphasis being placed on the method which employs the reaction of diphenyl phosphorus trichloride and ammonium chloride in anhydrous tetrachloroethane. The yields reported by this method are quite low, the combined yields of purified trimer and tetramer being about 10% with about half of the yield being the trimer with the second half of the yield being the tetramer. The reaction of diphenyl phosphorus trichloride with liquid ammonia required a complicated procedure including condensing liquid ammonia at minus 196° C. into a reaction vessel containing the diphenyl phosphorus trichloride after which the temperature was increased to minus 40° C. with the mixture being agitated two hours to complete the reaction. The resulting solid, after evaporation of the excess ammonia, was treated with $CHCl_3$, one half of the solid material dissolving leaving behind essentially pure ammonium chloride. Two distinct compounds were isolated from the chloroform solution by fractional crystallization, both of which on subsequent heating yielded a mixture of diphenyl phosphonitrile polymers. Pyrolysis of the mixture of the two intermediate compounds, by gradual heating to 275° C. over the course of 4 hours, yielded a mixture of diphenyl phosphonitrile polymers and ammonium chloride, the phosphonitrile material being isolated by extraction with benzene and amounting to a 65% yield, further isolation from a benzene solution giving a 48% yield of cyclic tetrameric diphenyl phosphonitrile and a 7% yield of the trimer.

The primary object of this invention is, therefore, to provide an improved method for the preparation of cyclic diphenyl phosphonitriles of the formula $[(C_6H_5)_2PN]_x$ characterized both by simplicity and high yields.

A still further object of this invention is to provide a method for the preparation of cyclic diphenyl phosphonitriles of the formula $[(C_6H_5)PN]_3$ in high yield.

These and other objects will become evident from the description which follows:

This invention is based on the reaction, under anhydrous conditions, of a mixture of diphenyl phosphorus trichloride and an excess of ammonium chloride in the absence of solvent. The reaction involves the following stoichiometry:

$$n(C_6H_5)_2PCl_3 + nNH_4Cl \rightarrow [(C_6H_5)_2PN]_n + 4nHCl \quad (1)$$

and its course can be followed by measurement of the hydrogen chloride liberated. Although vigorous evolution of HCl begins when the reaction mixture is at 100–110° C., the rate begins to drop off well before the theoretical amount is liberated. An increase in temperature speeds up the reaction and we find it expeditious to bring the bath temperature up to 190–210° C. After about 25 hours at this temperature about 85% of the theoretical amount of HCl had been evolved, indicating substantial completion of the reaction. Extraction of the resultant reaction product with a non-polar solvent gave cyclic phosphonitriles in 83% yield based on the starting diphenyl phosphorus trichloride. Fractional crystallization from benzene gave a 65% yield of the trimer and an 18% yield of the tetramer, both based on the starting diphenyl phosphorus trichloride reactant.

Although some tetramer is formed in this reaction, the novel result obtained is that the trimer yield is higher, by far, than that obtained by any known procedure. The yield of the trimer is such that the reaction may be said to be specific to a method of producing the trimer in exceptionally high yield.

The followng example illustrates the process of the invention. However, the example is intended to be illustrative only and is not to be construed as limiting the invention in any manner. The parts in the example are parts by weight.

Fifty-eight parts of diphenyl phosphorus trichloride and 77 parts of $NH_4Cl$ are thoroughly mixed and placed in a large glass tube. A cap of 70 parts of $NH_4Cl$ is placed on top of the mixture and the tube is placed in an oil bath. A stream of dry nitrogen is passed over the mixture and an exit tube is connected to a trap containing standardized NaOH solution with phenolphthalein indicator as a means for following the reaction and heating is begun. Although HCl is evolved vigorously when the bath temperature reaches 100–110° C., the rate slows down after about 2 hours and the temperature is increased to 190–210° C., effecting an increase in the rate of HCl evolution. After 25 hours at 190–210° C., about 85% of the amount of HCl based on Equation 1 above has been evolved. Heating is discontinued and the reaction product mixture is extracted with hot anhydrous benzene to separate the desired products from residual $NH_4Cl$. After standing overnight at room temperature the benzene solution contains white, crystalline material, 7.0 grams, melting sharply at approximately 340° C. (beyond the calibrated portion of the thermometer). The infrared curve for this compound is identical with that of known diphenyl phosphonitrile tetramer; a mixed melting point with known tetramer shows no depression. Analytical data.—Found: P, 15.43; N, 7.06; Cl, 0.0; C, 72.64; H, 5.11%. Calculated for $(C_6H_5)_2PN$: P, 15.55; N, 7.07; Cl, 0.0; C, 72.32;

H, 5.06%. Removal of benzene from the residual solution gives 28.6 grams of white solids; recrystallization from benzene gives 26.1 grams of purified material, melting at 229–30° C. (Fisher-Johns block, uncorrected) and having infrared absorptions identical with those of known diphenyl phosphonitrile trimer; a mixed melting point with known trimer shows no depression. Analytical values: P, 15.50; N, 7.04; Cl, 0.00; C, 72.44; H, 5.11%. Based on the amount of starting diphenyl phosphorus trichloride, an 83% conversion to cyclic phosphonitriles is obtained of which 65% is trimer and 18% is tetramer.

We claim:

A process for the manufacture of a mixture of cyclic diphenyl phosphonitriles in which the yield of said phosphonitriles is predominantly $[(C_6H_5)_2PN]_3$ and a lesser amount of $[(C_6H_5)_2PN]_4$ which comprises heating a mixture consisting of diphenyl phosphorus trichloride and an excess of ammonium chloride under anhydrous conditions and in the absence of solvent to a temperature of about 190° to 210° C. for a period of time sufficient to substantially complete said cyclic diphenyl phosphonitrile forming reaction.

References Cited in the file of this patent

UNITED STATES PATENTS 2,853,517  Fitzgerald _____ Sept. 23, 1958

OTHER REFERENCES

Haber et al.: J. American Chem. Soc., vol. 80, pages 2116–2117 (1958).